(12) United States Patent
Andersson et al.

(10) Patent No.: US 6,703,616 B1
(45) Date of Patent: Mar. 9, 2004

(54) APPARATUS AND A METHOD FOR MEASURING RADIATION

(75) Inventors: Olof Andersson, Nyköping (SE); Ulf Ljungdahl, Oxelösund (SE); Curt Stenquist, deceased, late of Nyköping (SE); by Monica Stenquist, Nyköping (SE), legal representative; by Sofia Stenquist, Nyköping (SE), legal representative; by Charlotta Stenquist, Linköping (SE), legal representative; Lennart Wärme, Tystberga (SE)

(73) Assignee: Wedholm Medical AB, Nyköping (SE)

( * ) Notice: Subject to any disclaimer, the term of this patent is extended or adjusted under 35 U.S.C. 154(b) by 0 days.

(21) Appl. No.: 09/554,901

(22) PCT Filed: Nov. 19, 1998

(86) PCT No.: PCT/SE98/02097

§ 371 (c)(1), (2), (4) Date: Jan. 8, 2001

(87) PCT Pub. No.: WO99/27386

PCT Pub. Date: Jun. 3, 1999

(30) Foreign Application Priority Data

Nov. 20, 1997 (SE) .............................................. 9704259
Mar. 20, 1998 (SE) .............................................. 9800937

(51) Int. Cl.$^7$ .............................................. G01T 1/18
(52) U.S. Cl. ..................... 250/328; 250/394; 250/515.1
(58) Field of Search ................... 250/328, 393, 250/366, 394, 515.1

(56) References Cited

U.S. PATENT DOCUMENTS

| | | | |
|---|---|---|---|
| 3,890,505 A | * | 6/1975 | Olson .......................... 250/328 |
| 3,924,128 A | * | 12/1975 | Frank .......................... 250/328 |
| 4,185,199 A | * | 1/1980 | Droullard et al. ........... 250/364 |
| 4,418,282 A | | 11/1983 | Horrocks |
| 4,694,176 A | * | 9/1987 | Horrocks .................... 250/328 |
| 4,695,728 A | * | 9/1987 | Gibes ....................... 250/336.1 |
| 4,786,810 A | * | 11/1988 | Shulman et al. ............ 250/328 |
| 4,803,052 A | | 2/1989 | Abromaitis et al. |
| 5,206,708 A | | 4/1993 | Knapp et al. |
| 5,483,070 A | * | 1/1996 | Valenta ....................... 250/362 |
| 5,866,907 A | * | 2/1999 | Drukier et al. ............. 250/328 |
| 5,936,246 A | * | 8/1999 | Skinner .................... 250/336.1 |

FOREIGN PATENT DOCUMENTS

| | | |
|---|---|---|
| SE | 458313 B | 3/1989 |
| WO | WO 96/32062 A1 | 10/1996 |
| WO | WO98/11454 | 3/1998 |

OTHER PUBLICATIONS

"Microcounter 2420" Pocket–sized Sample Tester, Published by STUDSVIK INSTRUMENT AB, Nykoping, Sweden (Aug. 1994).

(List continued on next page.)

Primary Examiner—Albert Gagliardi
(74) Attorney, Agent, or Firm—Burns, Doane, Swecker & Mathis, L.L.P.

(57) ABSTRACT

A method and an apparatus for measuring low energy radiation from a sample provided on a sample carrier (6, 6'). The sample is positioned in a shielded cavity (8) between two oppositely aligned Geiger-Müller tubes (11, 12) such that sample radiation either reaches both of the tubes or one of the tubes, in which case the other tube is for measuring background radiation only. Both tubes are used for measuring coincidental pulses, which are disregarded. A background radiation value, to be subtracted for obtaining a sample radiation value, is determined using either a historical background radiation value or both the historical background radiation value and a background radiation value obtained during the actual sample measurement. In the case of both tubes measuring sample radiation, there can be provided a third Geiger-Müller tube (13) for measuring background radiation only.

33 Claims, 10 Drawing Sheets

OTHER PUBLICATIONS

"NT 200" Smear Test Instrument, Published by NUTRONIC AB, Gävle, Sweden (1998).

Manual Sample Changer FHT 770K, Published by FAG Kugelficher (Aug. 31, 1987).

"Introduction Radiation Detectors", P.N. Cooper, Cambridge University Press, Cover Page, Contents Page and pp. 28 and 29 (1986).

* cited by examiner

APPARATUS AND A METHOD FOR MEASURING RADIATION

TECHNICAL FIELD OF THE INVENTION

The present invention relates to an apparatus and a method for measuring radiation emanating from a sample containing a radiant matter.

BACKGROUND OF THE INVENTION

Certain conditions and diseases can be indicated by analysing a sample of exhaled air in order to establish the concentration of a certain substance. One example is a method of detecting Helicobacter Pylori in the gastrointestinal tract, a good indication of gastric ulcer, by measuring in exhaled $CO_2$ the concentration of $^{14}C$, used as a label for a urea preparation swallowed prior to the measurement. The concentration is determined by measuring β-radiation emanating from $^{14}C$. However, since the emanation from $^{14}C$ is low energy β-radiation this method today requires the use of expensive, time consuming and bulky apparatus.

The provision of simple and cheap methods for use in decentralised health care has still not been adequately solved. Thus, there is a need for methods and improved apparatuses for detecting low energy radiation, particularly for use in health care, which are simple, cheap, small, and which provide satisfactory diagnostic accuracy.

SUMMARY OF THE INVENTION

An object of the present invention is to provide a method for measuring low energy radiation emanating from a radiant matter in a sample, particularly for measuring β-radiation emanating from a $^{14}C$ labelled compound, that is fast, simple and provides satisfactory accuracy.

A further object of the present invention is to provide an apparatus for measuring low energy radiation emanating from a radiant matter in a sample that is cheap, light in weight and small in size.

Yet another object of the invention is to provide an apparatus that for beneficial manufacturing and service purposes comprises no moving parts at all.

The objects mentioned above are achieved according to the invention by a method, an apparatus, and a combination of an apparatus and a sample device having the features defined in the appended claims.

According to a first aspect of the present invention there is disclosed an apparatus for measuring low energy sample radiation emanating from a sample containing a radiant matter, comprising first and second radiation detectors for measuring said radiation and background radiation, said first and second detectors being positioned substantially parallel with their respective active surfaces facing each other in an aligned position, at a distance allowing for temporary insertion of a sample device of planar configuration in a measurement cavity between the detectors;

external shielding means enclosing the radiation detectors, said shielding means reducing background radiation present in the measurement cavity, said shielding means being provided with an opening for receiving said sample device;

electronic processing means for handling decay pulses received from the radiation detectors, calculating from said pulses the radiation originating from the sample and evaluating the result of said calculation; and means for recording and/or displaying the results of said evaluation.

According to a second aspect of the present invention there is disclosed a combination of an apparatus described above and a sample device having a planar configuration and comprising a sample carrier and radiant sample matter carried by said sample carrier, said radiant sample matter being provided on said sample carrier such that sample radiation radiates from both surface sides of said sample carrier, said surface sides facing said first and second radiation detectors, when the sample device has been inserted into said apparatus.

According to a third aspect of the present invention there is disclosed a combination of an apparatus described above and a sample device having a planar configuration and comprising a sample carrier and radiant sample matter carried by said sample carrier, said radiant sample matter being provided on said sample carrier such that sample radiation substantially only radiates from one surface side of said sample carrier, said one surface side facing said first radiation detector when the sample device has been inserted into said apparatus.

According to a fourth aspect of the present invention there is disclosed a method for measuring low energy sample radiation emanating from a sample containing a radiant matter, comprising the steps of:

inserting a sample into a measurement cavity, between two aligned radiation detectors facing each other, such that said sample radiation reaches only a first detector of said radiation detectors;

measuring, for a predetermined time period, the respective number of output pulses originating from ionising events occurring in the respective radiation detectors;

providing a first radiation value obtained from the number of pulses from said first detector, and a second radiation value obtained from the number of pulses from the second detector;

providing a sample radiation value by subtracting a background radiation value from said first value, wherein said background radiation value is based upon a historical background radiation value obtained prior to insertion of the sample, by means of said second detector, as well as said second radiation value;

evaluating said sample radiation value, thereby determining the amount of radiant matter in the sample.

According to a fifth aspect of the present invention there is disclosed a method for measuring low energy sample radiation emanating from a sample containing a radiant matter, comprising the steps of inserting a sample into a measurement cavity, between two aligned radiation detectors facing each other;

measuring, for a predetermined time period, the respective number of output pulses originating from ionising events occurring in the respective radiation detectors;

providing a first radiation value obtained from the measured number of pulses from said first detector, and a second radiation value obtained from the measured number of pulses from the second detector;

providing a sample radiation value by subtracting a background radiation value from the sum of said first and second radiation values, wherein said background radiation value is based upon a historical background radiation value obtained prior to insertion of the sample; and evaluating said sample radiation value, thereby determining the amount of radiant matter in the sample.

According to a sixth aspect of the present invention there is disclosed a method for measuring low energy sample radiation emanating from a sample containing a radiant matter, the method comprising providing a first radiation detector and a second radiation detector such that the two radiation detectors both measure substantially the same background radiation;

using said second radiation detector for measuring a historical background radiation mean value;

thereafter positioning the sample relative to said radiation detectors such that sample radiation reaches said first radiation detector only;

measuring both output pulses from said first radiation detector and output pulses from said second radiation detector; and calculating a sample radiation value by subtracting from a measured number of output pulses from said first radiation detector a corresponding background radiation value based upon said historical background radiation mean value and the measured number of output pulses from said second radiation detector.

According to a seventh aspect of the present invention there is disclosed A method for measuring low energy sample radiation emanating from a sample containing a radiant matter, the method comprising providing a first radiation detector and a second radiation detector such that the two radiation detectors both measure substantially the same background radiation;

using said radiation detectors for measuring a historical background radiation mean value;

thereafter positioning the sample relative to said radiation detectors such that sample radiation reaches both radiation detectors;

measuring both output pulses from said first radiation detector and output pulses from said second radiation detector; and calculating a sample radiation value by subtracting from a measured number of output pulses from said detectors a corresponding background radiation value based upon said historical background radiation mean value.

Thus, the first and second radiation detectors are positioned in the measurement cavity substantially parallel in an aligned position, with their respective active surfaces facing each other. The detectors are adapted for enabling them to measure radiation emanating from a sample device, of substantially planar configuration, inserted into the measuring cavity, the sample being positioned as close as possible and substantially parallel to the detectors, so that scattering is minimised and essentially all radiation emanating from the sample will be able to reach the detectors. This configuration, in which the detectors face each other with the sample device inserted there between, ensures that no shielding from the sample radiation by the other detector will take place.

Said first and second radiation detectors can both be used for measuring sample radiation. This enables detection of radiation emanating from radiating surfaces on both sides of the planar configured sample device, and increases the number of ionising events measured. Thus, a higher diagnostic accuracy can be achieved. In this case, the background radiation to be subtracted from the sample measurement results constitutes a historical background radiation value, said historical value being obtained and updated prior to each insertion of a sample device into the measurement cavity. The historical value can be obtained using both radiation detectors for measuring the background radiation.

Alternatively, the second radiation detector can be used for measuring background radiation only. This provides a lower count of ionising events, but instead it gives a higher accuracy regarding the measured amount of background radiation to be subtracted, due to the fact that the amount of background radiation present in the measurement cavity changes over time. However, it has surprisingly been found that when subtracting the background radiation from the measurements of sample radiation a considerable improvement of the measurement accuracy can be achieved if the value corresponding to background radiation is a weighted mean value calculated from the result of the background radiation measurements performed during the sample radiation measurements and a historical background radiation value, said historical value being obtained and updated prior to each insertion of a sample device into the measurement cavity.

In order to ensure that sample radiation is not detected by the second radiation detector, in the case that the second detector is arranged to measure background radiation only, there can be provided internal shielding means. Said shielding means can either be a part of the apparatus, a part of the sample device or both. Preferably the sample radiation shield is removably mounted (inherently if in the sample device) so that it can be easily replaced if contaminated. In order to obtain a reliable value of the amount of background radiation present in the measuring cavity, it is important that the internal shielding of the second detector efficiently prevents radiation from the sample to reach the second detector, while at the same time preventing as little background radiation as possible from reaching the second detector. Therefore, the material and thickness of the internal shielding has to be chosen with respect to the energy content and type of the sample radiation being measured.

In order to further improve the accuracy regarding the measuring of background radiation present in the measurement cavity during the sample radiation measurements, in the case of both the first and second detector measuring sample radiation, a third radiation detector can be provided within the measurement cavity. This enables measuring of background radiation simultaneously with the measuring of sample radiation. Said third detector can be placed behind said first or second detector, seen from the sample device, or in a position as close as possible to the sample.

When measuring the sample radiation or the background radiation coincidental pulses, i.e. radiation pulses that strikes both the first and second radiation detectors simultaneously, can automatically be disregarded, since coincidental pulses can, with a very high probability, not originate from the sample due to the orientation of the radiating surfaces of the sample relative the first and second radiation detectors and to the relative small number of ionising events emanating from the sample. This can be done by not, or separately, registering ionising events occurring in both the first and second radiation detectors within a predetermined, short time interval.

Preferably, the apparatus according to the invention further comprises a sample position detector for detecting whether the sample is in its correct position and to prevent the start of a sample radiation measurement if this is not the case. Said detector is used in order to ensure that as much of the sample radiation as possible is caught by the first radiation detector. If the sample would not be in the correct position, scattering of the radiation would result in a false, low, count of ionising events and a false value of the amount of radiant matter. When the apparatus is used for diagnostic purposes this in turn could lead to a wrong diagnosis.

In order to decrease the amount of background radiation present in the measuring cavity, said cavity can be enclosed by an external shield made out of a high density material. This will improve the signal to noise ratio and thereby increase the accuracy of the measurements.

In order for the sample not to contaminate the measuring cavity, the sample device can be provided with a sample matter cover that is not permeable to the sample matter but is permeable to the sample radiation. Such a cover can consist of a thin film of some sort. Preferably, the cover consists of a mylar film with a typical thickness of about 1 $\mu$m.

The radiation detectors will in the following description be illustrated in a horizontal position. However, this shall not be seen as a restriction of the invention, merely as an illustration of preferred embodiments of the present invention. Several other alternatives are contemplated within the scope of the invention, such as placing the detectors vertically, etc. Placing the first and second detectors vertically, with the sample device placed vertically between the detectors, would eliminate the risk of the sample matter contaminating these detectors because the radiating matter can not fall on to the detectors.

With regard to means used for the actual detection of radiation, the man skilled in the art realises that various types of detector means could be used, such as proportional counters or, as is preferred, Geiger-Müller tubes. Thus, for the purpose of making the description more comprehensive, the rest of the description will refer to Geiger-Müller tubes as means for detecting radiation.

The radiation detectors in the apparatus according to the invention are not limited to a specific shape or size. However, since it is an object of the present invention to provide a cheap and small measuring apparatus the Geiger-Müller tubes shall consequently meet the same requirements. The described configuration of the apparatus along with the described method of measuring sample radiation enables, with maintained satisfactory diagnostic accuracy, the use of the cheapest and smallest Geiger-Müller tubes in use today.

DETAILED DESCRIPTION OF PREFERRED EMBODIMENTS OF THE INVENTION

Figure 1:
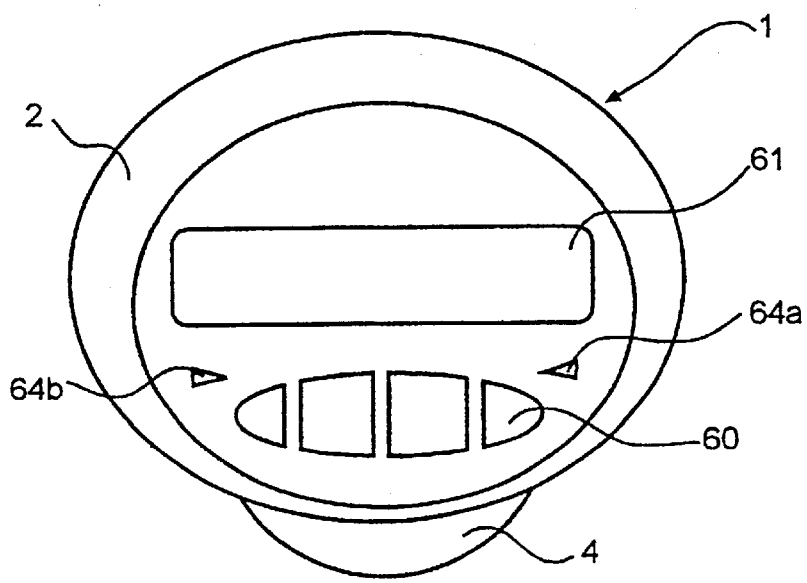
FIGS. 1–4 schematically show top, bottom, front, and side views of an apparatus according to preferred embodiments of the present invention.
Figure 2:
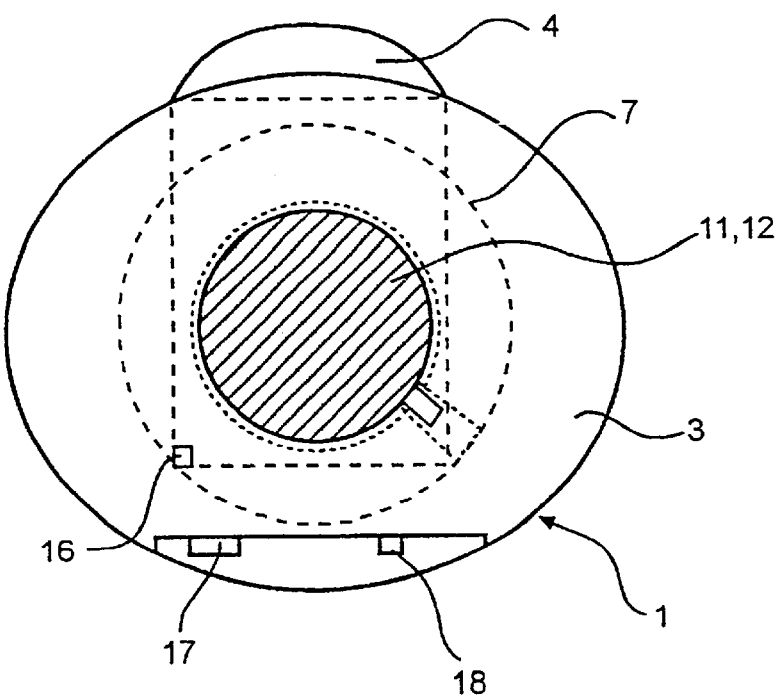
Figure 4:
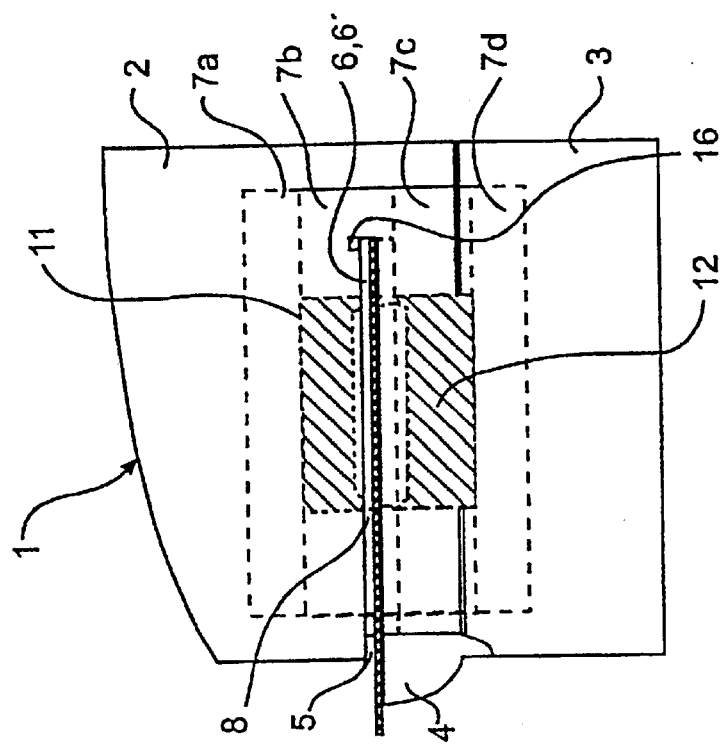
Figure 3:
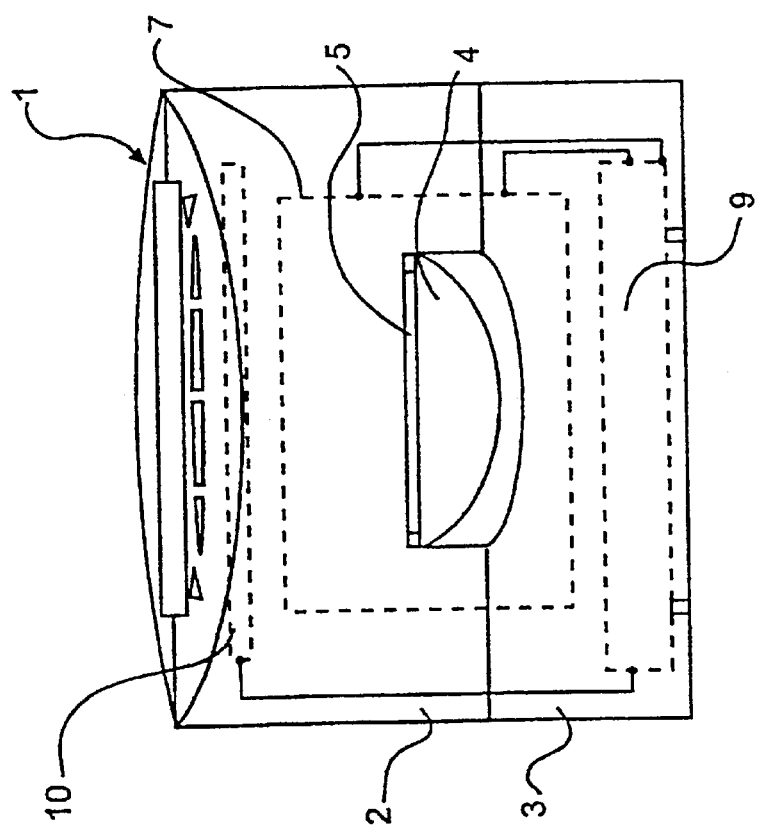

Referring to FIGS. 1–9 there is shown an embodiment of an apparatus of the present invention. The apparatus 1 comprises a housing comprising separate, essentially cylindrical top and bottom portions 2, 3 formed by a plastic material. An externally protruding guide tongue 4 is fitted between the top and bottom portions 2, 3 extending inwardly from the side wall of top portion 2 to form a flat support area for a sample device 6 with a planar configuration. The guide tongue 4 is provided with a circular hole 4a and two guide flanges 4b and 4c. A slot opening 5 is formed between the top portion 2 and the guide tongue 4 for receiving the sample device 6, the sample device 6 filling up said slot opening 5 when in an inserted position.

The apparatus further comprises a carbon steel background radiation shielding 7 mounted between the top and bottom portions 2, 3. This shielding consists of four separate cylindrical shields 7a, 7b, 7c, 7d tightly fitted together. Said first and fourth shields 7a, 7d have a uniform thickness while said second and third shields 7b, 7c are provided with a respective through hole for accommodating a respective first and second Geiger-Müller tube 11, 12. Said second shield 7b, containing the first tube 11, is also provided with a cut-in portion for receiving the mounted guide tongue 4. Said cut-in portion can best be seen in FIG. 2. The Geiger-Müller tubes 11, 12 are mounted parallel to each other with their slightly depressed circular active surfaces 11a, 12a closely facing each other in an aligned position. Said tubes 11, 12 form between them, together with the cut-in portion of said second shield 7b, a measurement cavity 8 for receiving the sample device 6. The second Geiger-Müller tube 12 is, according to an embodiment of the present invention, arranged so as not to receive any radiation from the sample 6b, either by the sample device 6 itself being arranged to provide sample radiation in one direction only, or by having a separate sample radiation shield (not shown) positioned within the cavity 8 between the second tube 12 and the sample device 6. Such a separate radiation shield should be arranged so as not to shield the second tube from background radiation noticeably. Such a shield could preferably be disposed in said circular hole 4a of said guide tongue 4.

The mutually facing active surfaces 11a, 12a of the first and second Geiger-Müller tubes 11, 12 are operatively separated by a distance substantially corresponding to the height of the slot 5, which is adapted for insertion of a sample device 6 of planar configuration and for positioning the radiant matter of the sample as close as possible to said first tube during the measuring of sample radiation.

Figure 6:
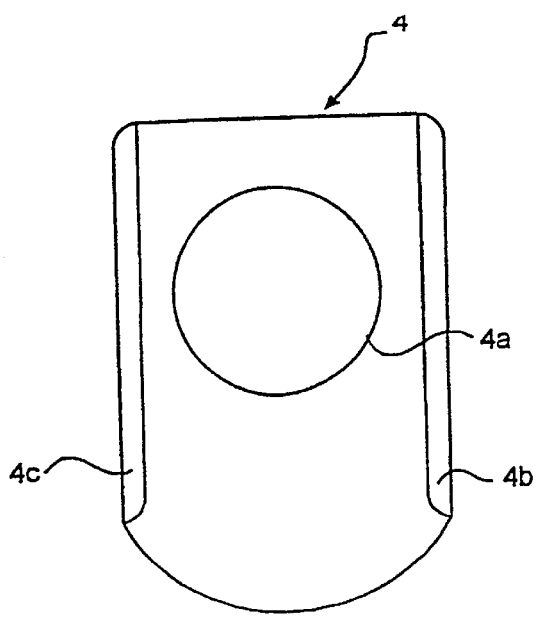
FIGS. 6–8 schematically show a top view of a guide tongue, and top and cross section views of sample devices according to preferred embodiments of the invention.
Figures 7A, 7B:
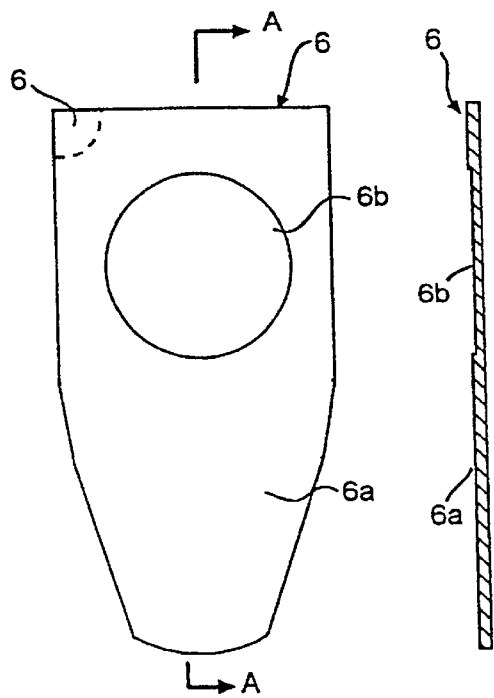
Figure 8:
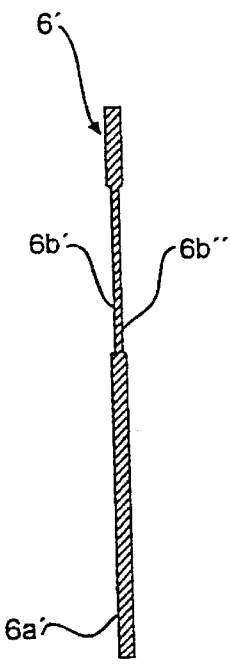
Figure 9:
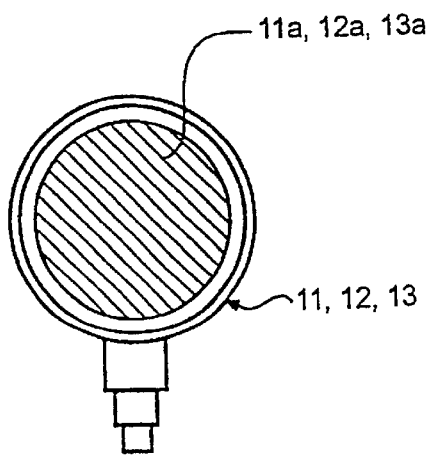
FIG. 9 schematically shows a view of a Geiger-Müller tube according to preferred embodiments of the invention.

Referring now to FIGS. 6–8, there is shown an example of a sample device 6, an alternative sample device 6' and the guide tongue 4. The sample device 6 typically consists of a flat sample carrier 6a, having a configuration generally corresponding to the configuration of the guide tongue 4 and a thickness corresponding to the height of the slot opening 5, which on one surface provides an area 6b with a circular hole, forming a window, wherein there is mounted a $CO_2$ absorbing material that contains the actual sample labelled with $^{14}C$. The sample carrier 6a is formed by a plastic material which shields its surroundings from sample radiation, except for the part where the window 6b is. Hence, the radiating matter radiates from said window 6b only. Said window 6b is further provided with a thin protective film for avoiding contamination of the measurement cavity 8. Said sample carrier 6a is also provided with an area 6c with high reflexivity, which enables detection by a sample device position detector 16. Said area 6c is positioned on the upper, most inward left corner of the sample carrier 6a, seen in the direction of insertion.

The alternative sample device 6' consists of a flat sample carrier 6a', with the same features as the above described sample carrier 6a, which on one surface provides an area 6b$^I$ and on the other surface an area 6b$^{II}$, both of said areas having the same features as the above described area 6b. Hence, the alternative sample device 6$^I$ is arranged to provide sample radiation in both directions. Said alternative sample device is further provided with an area with high reflexivity (not shown), as the above described sample device.

The guide tongue 4 has guide flanges 4b, 4c for guiding the sample device 6, 6$^I$. The guide flanges converge slightly towards the centre of the apparatus 1 to provide for correct positioning of the corresponding sample device 6 in the measuring cavity 8 defined by the tubes 11, 12, i.e. so that the windows. 6b, 6b$^I$, 6b$^{II}$ of the sample device 6, 6$^I$ are aligned with said respective active surfaces 11a, 12a of said Geiger-Müller tubes 11, 12. In order for the background radiation that reaches the measurement chamber 8 to be equally detected by both tubes 11, 12, the guide tongue 4 is provided with said through hole 4a. The only shielding of background radiation between the tubes 11, 12 in the chamber 8 is by the sample device 6, 6$^I$ itself. Said device is however designed not to shield with regard to background radiation.

In order to decrease the amount of background radiation entering the measurement cavity 8 the slot opening 5 continues into an elongate space formed between the second and third background radiation shields 7b, 7c, which has a height substantially in correspondences with the thickness of the planar sample device 6, 6$^I$. Due to the geometry of the space formed between said shields 7b, 7c, only a smaller portion of background radiation can enter the measurement cavity 8 through said slot opening 5. The height of said space is adapted so that said areas 6b, 6b$^I$, 6b$^{II}$ of said sample carrier 6a, 6a$^I$ containing the actual sample are positioned as close as possible to said first and second Geiger-Müller tubes 11, 12.

The apparatus further comprises the sample device position detector 16 for detecting both whether the sample device 6, 6$^I$ has been inserted with the correct orientation, and whether said device has reached the correct position. The position detector consists of a reflection sensor that can detect an area 6c of the sample device 6, 6$^I$ having high reflexivity. Said position detector 16 is mounted in said second shield 7b at the inward end of the guide tongue 4.

Figure 5:
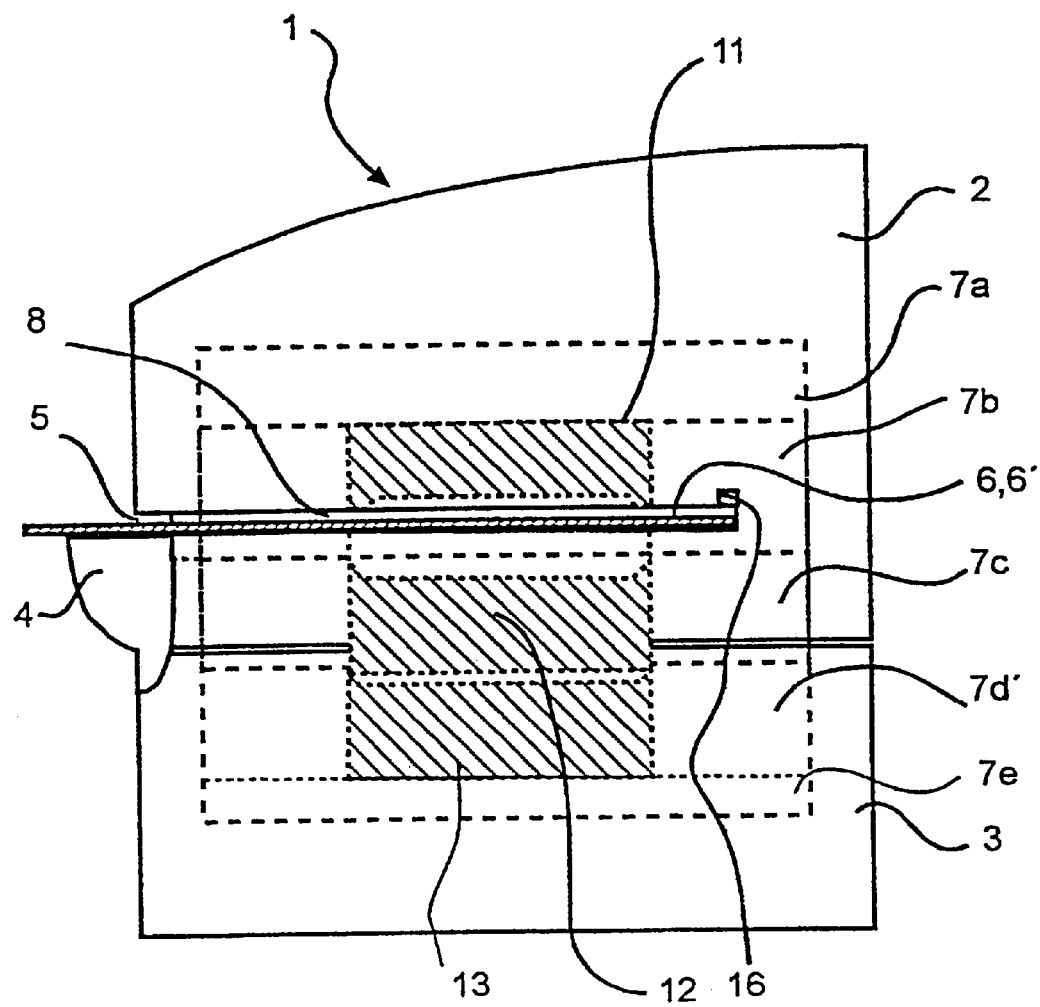
FIG. 5 schematically shows a side view of an apparatus according to an alternative embodiment of the present invention.

Referring to FIG. 5 there is shown an apparatus according to an alternative embodiment of the present invention. The apparatus comprises a carbon steel background radiation shielding 7 consisting of five separate cylindrical shields 7a, 7b, 7c, 7d$^I$, 7e, where the three top shields 7a, 7b, 7c have the same features as previously described. The fourth shield 7d$^I$ is provided with a through hole for accommodating a third Geiger-Müller tube 13, and the fifth shield has a uniform thickness. The three Geiger-Müller tubes 11, 12, 13 are all mounted parallel to each other in an aligned position, the first and second tubes 11, 12 having with their active surfaces 11a, 12a closely facing each other in an aligned position. Said tubes 11, 12 form between them, together with the cut-in portion of said second shield 7b, a measurement cavity 8 for receiving said alternative sample device 6$^I$. Thus, the first and second Geiger-Müller tubes are arranged for measuring sample radiation. The third Geiger-Müller tube is arranged for measuring background radiation only.

In the bottom portion 3 of the housing underneath the background radiation shield 7 there is mounted a circuit board comprising a first electronic unit 9. Regarding to FIG. 2, said unit 9 comprises a central processing unit (CPU) 50; an EPROM 62; a real time clock 63; a detector voltage unit 15 comprising a voltage transformer and a voltage control unit; pulse shapers 31, 32, 33; a logical OR element 44; and pulse duration modifiers 41, 42, 43. The CPU 50 can be accessed externally via a serial port 17 (FIG. 2) disposed on the back wall of the bottom portion 3 of the housing. Next to the serial port 17 there is also provided a connector 18 for connecting a conventional battery eliminator (9V, 7 W) that supplies the instrument with low voltage DC power.

Figure 10:
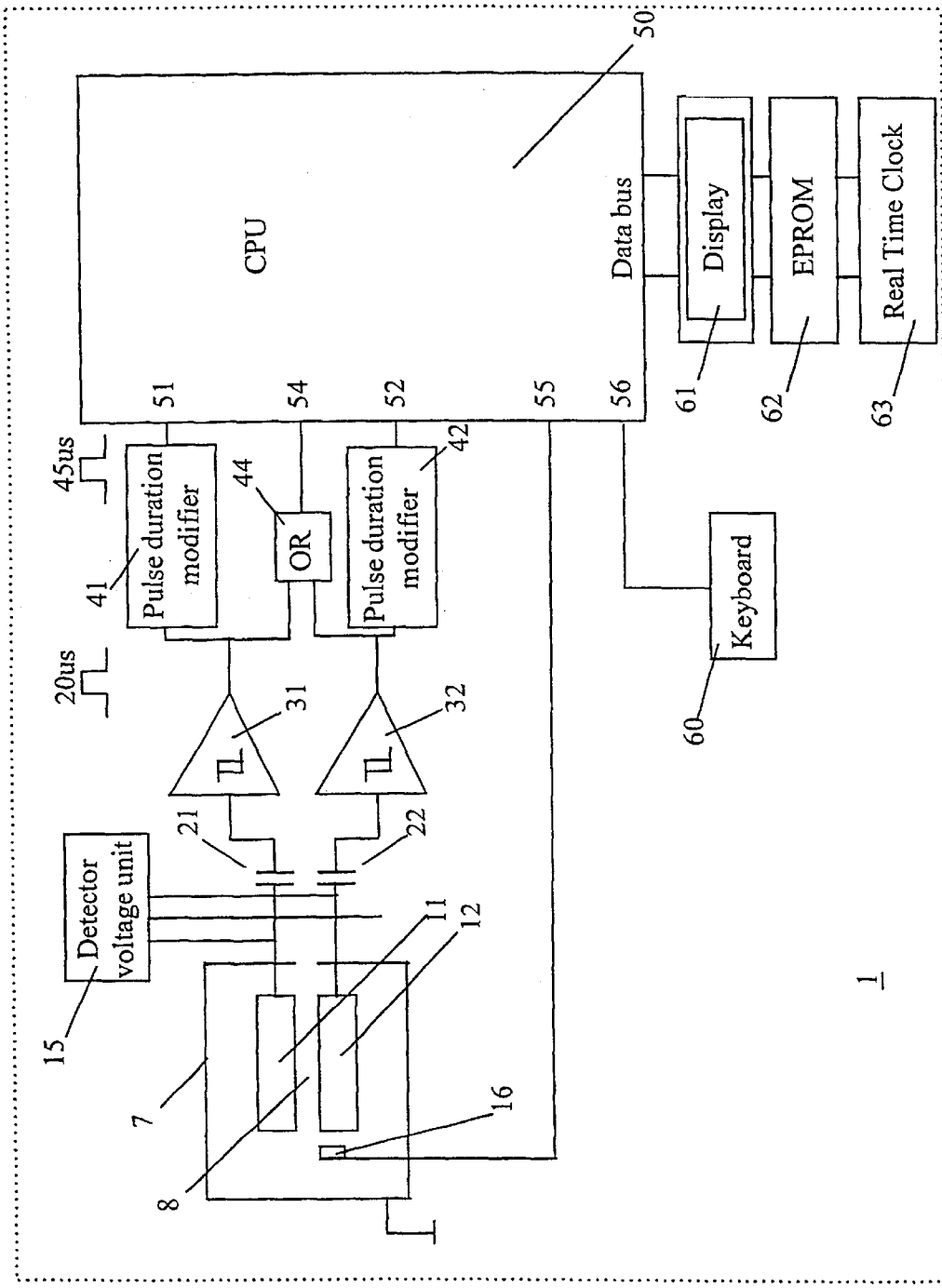
FIGS. 10 and 11 schematically show block diagrams of the electronic circuitry according to preferred embodiments of the invention.
Figure 11:
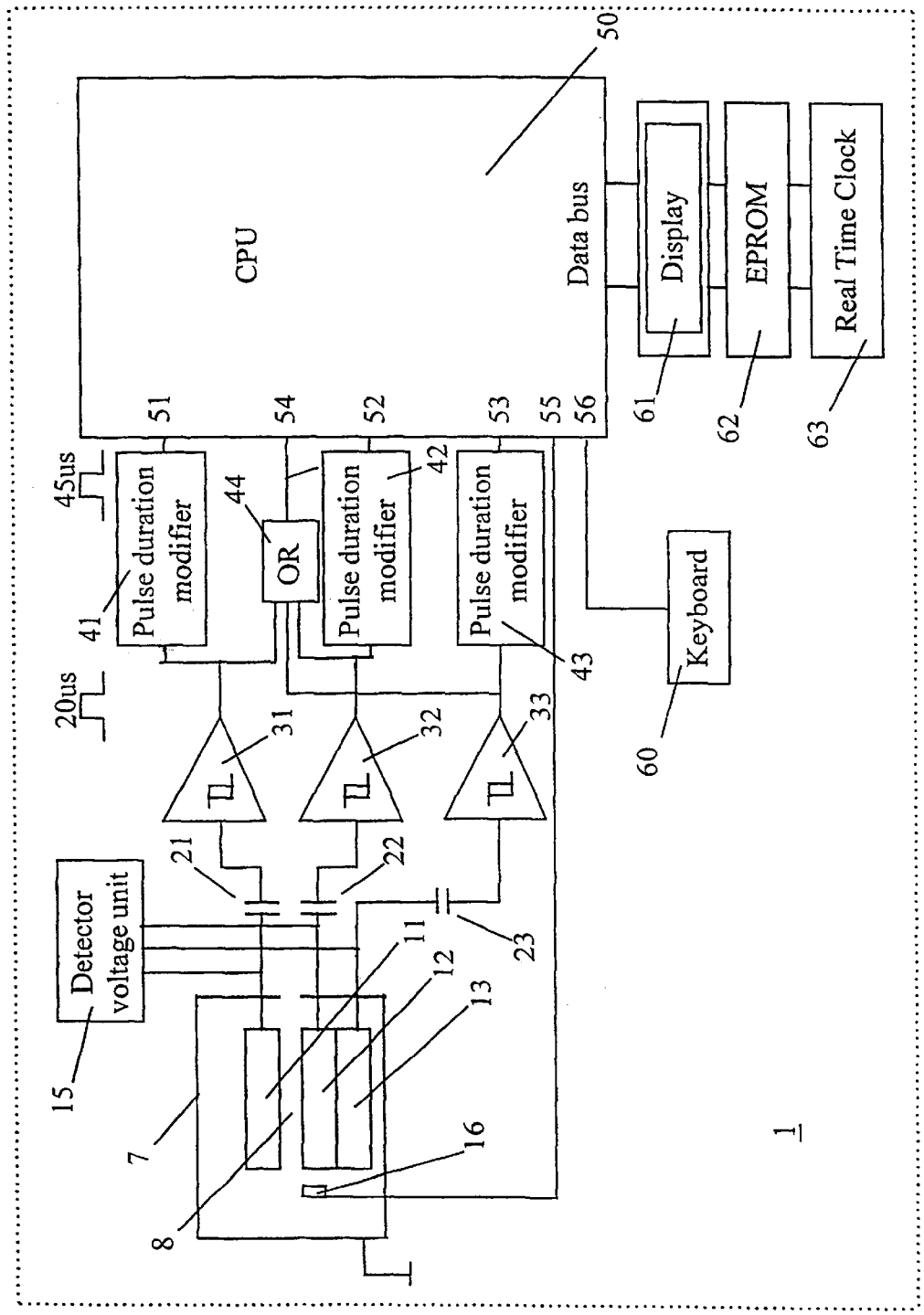

The first electronic unit 9 is also connected to a second electronic unit 10 positioned in the top portion 2 of the housing above said background radiation shield. Referring to FIGS. 1, 10 and 11, said second electronic unit comprises a display 61. The display 61 is a 16×2 segments back lit liquid crystal display (LCD) which can be seen through an upward facing window in said top portion 2. A keyboard 60, being an integral keyboard with 4 membrane keys for initiating pre-programmed program menus, and two light emitter diodes (LED) 64a, 64b are also disposed on top of said top portion 2 and are electrically connected to said first electronic unit 9 through an opening (not shown) of said top portion 2. The LED's 64a, 64b consist of a green and a yellow double LED, for indicating sample measurement status or stand by status, and a red LED, for indicating error of some sort.

Referring again to FIGS. 10 and 11 there is shown a block diagram of the electronic circuitry in connection with two detectors (FIG. 10) and in connection with three detectors (FIG. 11). The Geiger-Müller tubes 11, 12, 13 are positioned within the shield 7 and respectively connected to the detector voltage unit 15 and, via capacitors 21, 22, 23 to a respective pulse shaper 31, 32, 33. The respective pulse shapers 31, 32, 33 are connected to respective pulse duration modifiers 41, 42, 43 as well as to a common logical OR element 44. Within the shield 7 there is also positioned the position detector 16 which is directly connected to an I/O port 55 of the CPU 50. The CPU 50 is also connected to the logical OR element 44 via an I/O port 54; to the pulse duration modifiers 41, 42, 43 via I/O ports. 51, 52, 53; to the keyboard 60 via an I/O port 56; and to the display 61, the EPROM 62 and the real time clock 63 via a data bus.

The CPU 50, a 68HC11 microprocessor, provides for instrument control and measurement data processing as well as controlling alarm functions. The EPROM 62 contains program code for the CPU 50, and the real time clock 63 provides time information for the analysis of the CPU 50. The alarm functions controlled by the CPU 50 include detector function and possible contamination of the measurement cavity 8. This is performed by measuring background radiation levels, when the measurement cavity 8 is empty, and by providing an alarm signal (optical and/or acoustic) when said level is above a pre-set level or zero.

The voltage control unit 15 controls the voltage transformer for transforming the low DC voltage supplied to a high voltage for the Geiger-Müller tubes of preferably about 500 V. The desired voltage level is set through an adjustment potentiometer (not shown).

Figure 12:
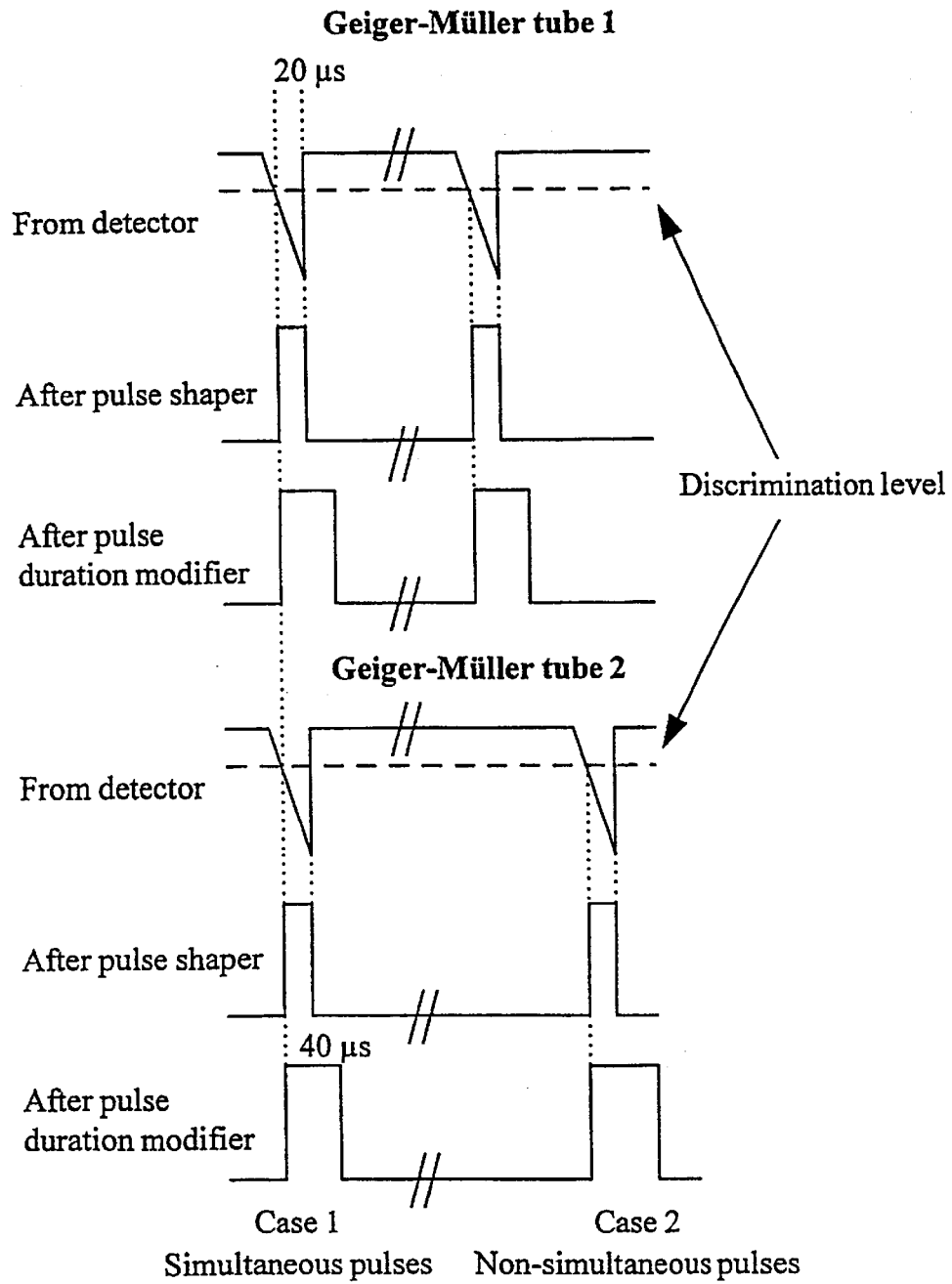
FIG. 12 schematically shows a pulse diagram.

The following description relates to the case of the apparatus comprising two radiation detectors. When an ionising event occurs in any of the Geiger-Müller tubes 11, 12 the respective pulse shaper 31, 32 receives a pulse from said tube, said received pulse being shaped into a square pulse, as can be seen in FIG. 12, with a pulse length of approximately 20 $\mu$s. The pulse shapers 31, 32 are provided with a discrimination level in order to remove possible noise. Each square pulse is then sent to the logical OR element 44 which thus sends a pulse to the CPU each time an ionising event is detected by at least one of the tubes 11, 12. Upon reception of a pulse from the OR element 44 the CPU 50 interrupts its current action and detects whether there is a pulse on any of the I/O ports 51, 52 and sets a variable (Var_port) to one of three possible values indicating: a pulse from detector 1, a pulse from detector 2 or pulses from both detectors, respectively. In order for the CPU 50 to be able to detect pulses occurring on said I/O ports 51, 52 when the CPU is busy, the pulses from the respective pulse shapers 31, 32 are passed to the CPU 50 via respective pulse duration modifiers 41, 42 that modifies the pulses from a duration of about 20 $\mu$s to a duration of about 40 $\mu$s. This can also be seen in FIG. 12.

Figure 13:
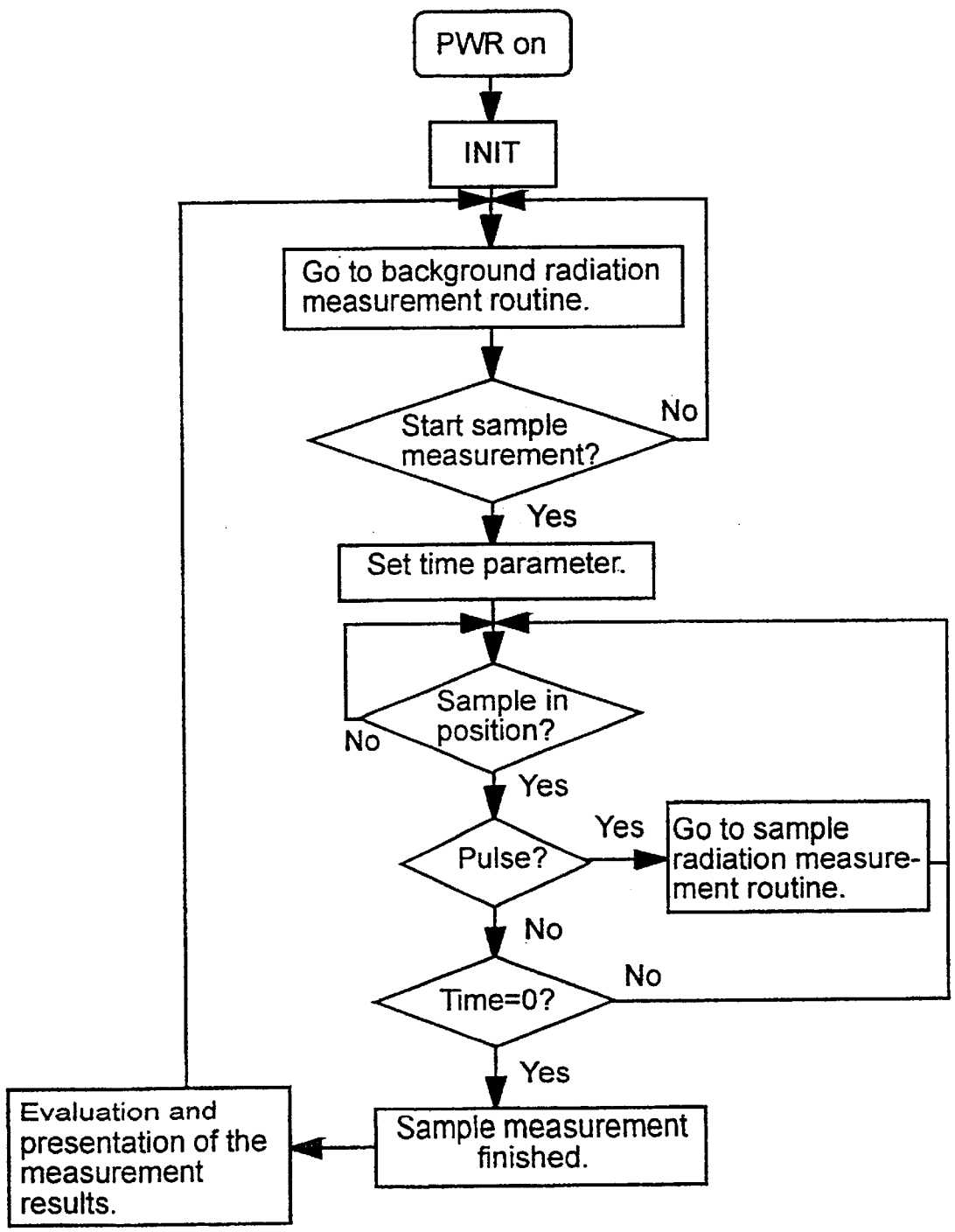
FIGS. 13–15 schematically show flow diagrams illustrating methods according to the preferred embodiment of the invention.
Figure 14:
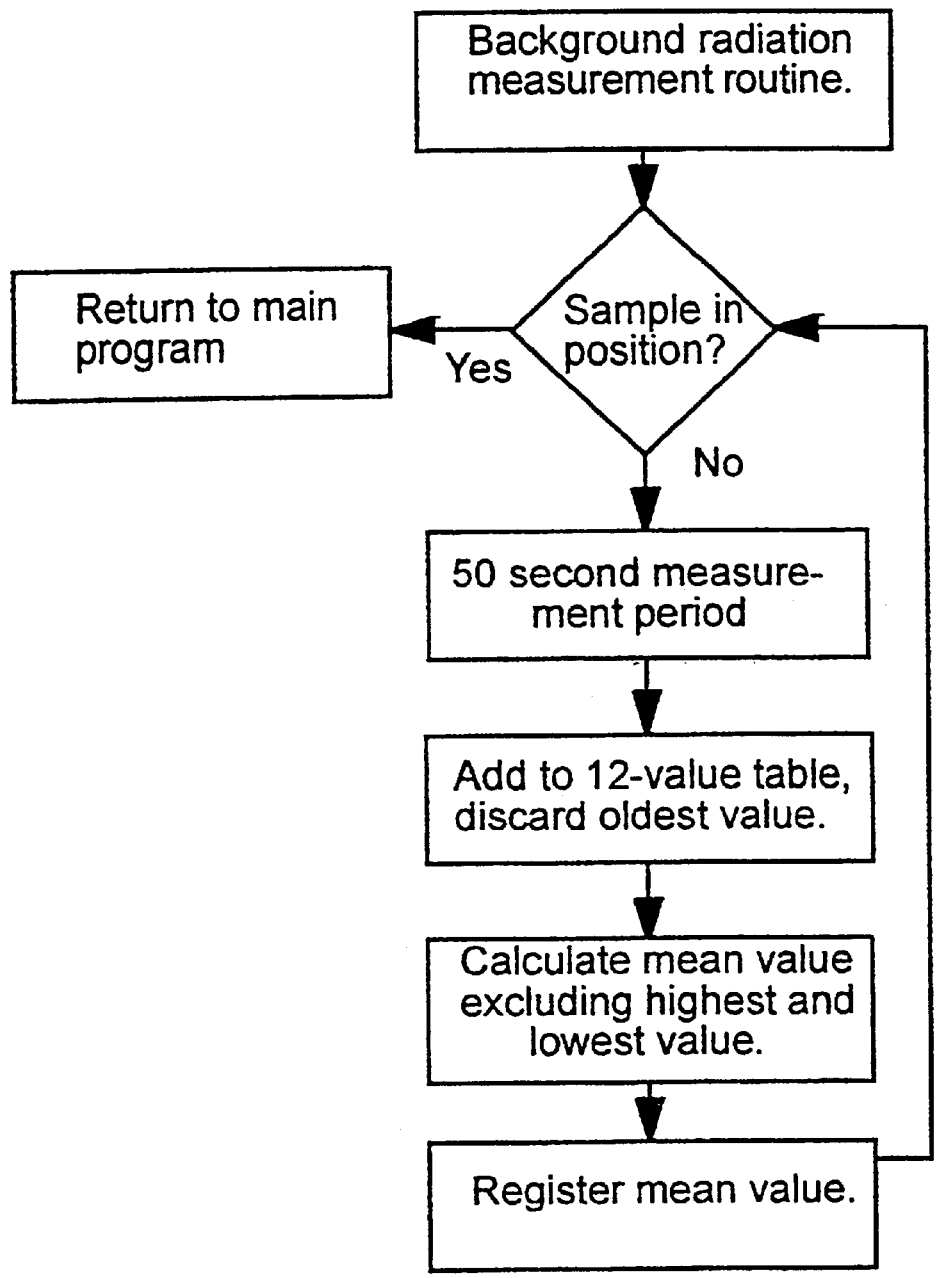
Figure 15:
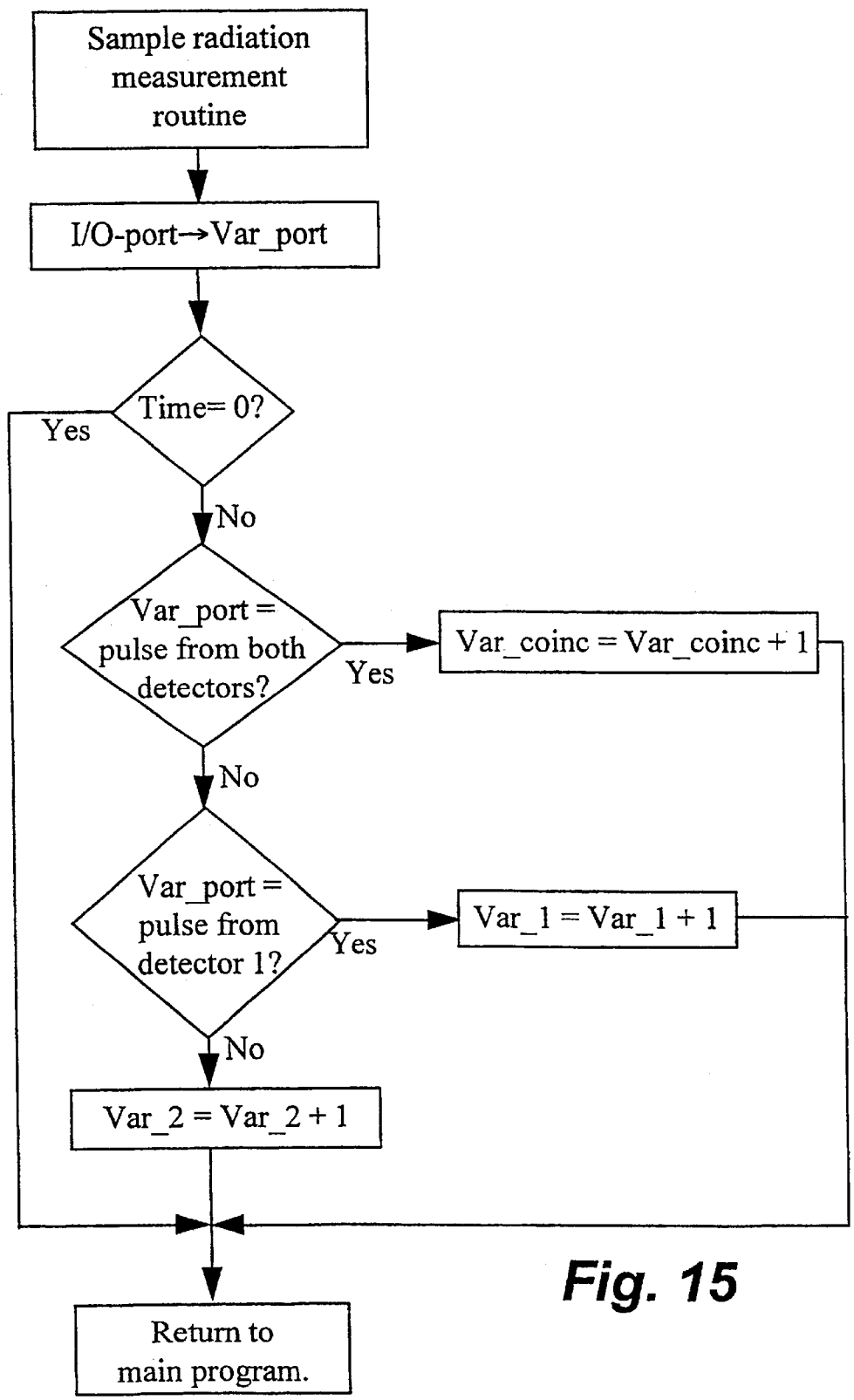

Referring now to FIGS. 13–15, there is shown flow diagrams of a method according to the invention, which will now be described in greater detail. After switching the apparatus on initiation routines are performed. The initiation routines include a 1,000 seconds background radiation measurement with both Geiger-Müller tubes 11, 12 in order to detect malfunctions of the tubes and/or the electronic circuits and also to detect possible contamination of the measuring cavity 8. Additionally the measurement from the second Geiger-Müller tube 12, or from both Geiger-Müller tubes 11, 12, is used to achieve a first value used for calculating a value corresponding to the amount of background radiation, hereinafter referred to as BGR, being present in the cavity 8 prior to insertion of the sample device 6, 6'. Following the initiation routines BGR is obtained while the instrument operates in a standby mode.

The method to obtain BGR is performed during time periods of predetermined length and the mean value of a pre-set number of latest measurement periods are registered as BGR. In the preferred embodiment a value in the form of the number of ionising events detected during a time period of 50 seconds is registered in a memory, thereby replacing a previously obtained value, which is discarded on a first in—first out (FIFO) basis, so that only the last 12 values are registered in the memory.

The mean value is then calculated from these values, excluding the highest value and the lowest value. All values are normalised to correspond to a time period of 1,000 seconds. Immediately following the end of a background radiation measurement period, the next background radiation measurement period begins. In this way, a constantly updated historical mean value corresponding to background radiation is achieved. Hence, as long as there is no sample device 6 positioned within the measurement cavity 8 BGR is continuously obtained and updated. When a sample device 6, 6' is inserted into said cavity 8 and detected by detector 16 the measuring of BGR is immediately stopped. As the measuring of BGR first begins the values in all 12 positions contain the number of ionising events registered during the initiation routine. Thus, the sample radiation measurement can begin immediately following the initiation routine. The registering of ionising events during the background radiation measurement is performed in the same manner as for the sample radiation measurement described below. Hence, coincidental pulses are disregarded during the background radiation measurement and BGR does not include coincidental pulses.

After insertion of a sample device 6, 6', containing a radiating sample, into the measuring cavity the sample position detector 16 detects whether the sample device 6, 6' is in the correct position and with the correct orientation for sample measuring. If so, the sample radiation measurement (FIG. 15) can begin when the start key is activated; if not, the position of the sample has to be adjusted for the sample radiation measurement to commence. Since the decay time of $^{14}$C is long, the time at which the sample radiation measurement begins is not a crucial factor.

When the central processing unit (CPU) receives the indication from the start key that sample radiation measurement shall begin, a time parameter is set to a chosen value, preferably 250 seconds, and a count-down immediately begins. Simultaneously, the CPU starts to register pulses received on the I/O ports 51, 52, 53, 54 from the OR element 44 and the pulse duration modifiers 41, 42, 43. A variable Var_port is set with a value corresponding to the Geiger-Müller tube or tubes, from where the pulse originate. Based on said Var_port one of the variables Var_coinc, for registering coincidental pulses; Var_1, for registering pulses originating from the first Geiger-Müller tube; and Var_2, for registering pulses originating from the second tube, is increased by 1. The separation of coincidental pulses is performed in order to simplify the following calculations, since coincidental pulses with very high probability do not originate from the sample radiation. In fact, in the case of the second tube being shielded from sample radiation coincidental pulses can not originate from the sample radiation.

When the sample radiation measurement time period has expired said time period is automatically extended in the case of a doubtful measuring result. A certain maximum extension time is pre-set in order to avoid excessively long extension times.

After expiration of the sample measurement period, including a possible extension period, the apparatus returns to monitoring BGR and the amount of radiation originating from the sample, D, is calculated by CPU 50. In the case of the second Geiger-Müller tube measuring background radiation only, this is accomplished according to the following equation $$D = D1 - \frac{D2 + BGR}{2}$$

where
D1=measured value of pulses generated in Geiger-Müller tube 1 (sample),
D2=measured value of pulses generated in Geiger-Müller tube 2 (background),
BGR=mean value corresponding to background radiation, each value being normalised to a time period of 1000 seconds.

Surprisingly, it has been found that the abovemenioned specific way of considering the background radiation improves the measurement accuracy considerably.

In the case of both Geiger-Müller tubes measuring sample radiation, the amount of radiation originating from the sample, D, is calculated according to the following equation $$D = D1 + D2 - BGR$$

where
D1=measured value of pulses generated in Geiger-Müller tube 1 (sample),
D2=measured value of pulses generated in Geiger-Müller tube 2 (sample),
BGR=mean value corresponding to background radiation, each value being normalised to a time period of 1000 seconds.

According to an alternative method of the present invention, in which both the first and the second Geiger- Müller tubes 11, 12 measure sample radiation, measuring of background radiation is also performed during the sample radiation measurements by a third Geiger-Müller tube 13. The registering of ionising events in the third tube 13 is achieved in the same manner as registering events from the first and second tubes 11, 12 as described above. Coincidental pulses are disregarded in the same manner as described above, with the difference that coincidental pulses refers to pulses simultaneously obtained from all three Geiger-Müller tubes.

In this case, the amount of radiation originating from the sample, D, is calculated according to the following equation $$D = D1 + D2 \frac{D3 + BGR}{2}$$

where
- D1=measured value of pulses generated in Geiger-Müller tube 1 (sample),
- D2=measured value of pulses generated in Geiger-Müller tube 2 (sample),
- D3=measured value of pulses generated in Geiger-Müller tube 2 (background),
- BGR=mean value corresponding to background radiation, each value being normalised to a time period of 1000 seconds.

The obtained value D, corresponding to the amount of radiation emanating from the sample, in the described methods according to the invention, is then compared to two pre-set threshold values L1, L2 for classification of the result. If the obtained sample radiation value D is below the first threshold value L1 the measurement result is classified as "Negative"; if the sample radiation value D is above the second threshold value L2 it is classified as "Positive". Hence, a value D between said first and second threshold values L1, L2 is classified as "Uncertain". The classification result is then presented on the display 61.

What is claimed is:

1. An apparatus for measuring low energy sample radiation emanating from a sample containing a radiant matter, comprising:
    first and second radiation detectors for measuring said radiation and background radiation, said first and second detectors being positioned substantially parallel with their respective active surfaces facing each other in an aligned position at a distance allowing for temporary insertion of a sample device of planar configuration in a measurement cavity between the detectors,
    external shielding means enclosing the radiation detectors, said shielding means reducing background radiation present in the measurement cavity, said shielding means being provided with an opening for receiving said sample device,
    electronic processing means for handling decay pulses received from the radiation detectors, calculating from said pulses the radiation originating from the sample and evaluating the result of said calculation, and
    means for recording and/or displaying the results of said evaluation,
    wherein said radiation detectors are Geiger-Müller tubes.

2. An apparatus as claimed in claim 1, comprising internal shielding means arranged such that sample radiation is prevented from reaching said second radiation detector.

3. An apparatus as claimed in claim 1, further comprising sample position detecting means for detecting whether an inserted sample device is in the correct position and has the correct orientation for measuring.

4. An apparatus as claimed in claim 1, further comprising
    means for registering coincidental pulses, coincidental pulses being pulses simultaneously measured by said first and second radiation detectors;
    means for subtracting the number of coincidental pulses from the number of pulses measured by said radiation detectors.

5. An apparatus for measuring low energy sample radiation emanating from a sample containing a radiant matter, comprising:
    first and second radiation detectors for measuring said radiation and background radiation, said first and second detectors being positioned substantially parallel with their respective active surfaces facing each other in an aligned position at a distance allowing for temporary insertion of a sample device of planar configuration in a measurement cavity between the detectors,
    external shielding means enclosing the radiation detectors, said shielding means reducing background radiation present in the measurement cavity, said shielding means being provided with an opening for receiving said sample device,
    electronic processing means for handling decay pulses received from the radiation detectors, calculating from said pulses the radiation originating from the sample and evaluating the result of said calculation, and
    means for recording and/or displaying the results of said evaluation, further comprising a third radiation detector for measuring background radiation only.

6. A combination of a sample device and an apparatus for measuring low energy sample radiation emanating from a sample containing a radiant matter,
    the sample device having a planar configuration and comprising a sample carrier and radiant sample matter carried by said sample carrier, said radiant sample matter being provided on said sample carrier such that sample radiation radiates from both surface sides of said sample carrier, said surface sides facing first and second radiation detectors, when the sample device has been inserted into said apparatus, and
    the apparatus comprising
        said first and second radiation detectors for measuring said radiation and background radiation, said first and second detectors being positioned substantially parallel with their respective active surfaces facing each other in an aligned position, at a distance allowing for temporary insertion of a sample device of planar configuration in a measurement cavity between the detectors,
        external shielding means enclosing the radiation detectors, said shielding means reducing background radiation present in the measurement cavity, said shielding means being provided with an opening for receiving said sample device,
        electronic processing means for handling decay pulses received from the radiation detectors, calculating from said pulses the radiation originating from the sample and evaluating the result of said calculation, and
        means for recording and/or displaying the results of said evaluation,
        wherein said radiation detectors are Geiger-Müller tubes.

7. A combination of a sample device and an apparatus for measuring low energy sample radiation emanating from a sample containing a radiant matter, the sample device having a planar configuration and
comprising a sample carrier and radiant sample matter
carried by said sample carrier, said radiant sample
matter being provided on said sample carrier such that
sample radiation substantially only radiates from one
surface side of said sample carrier, said one surface side
facing a first radiation detector when the sample device
has been inserted into said apparatus, the apparatus comprising:
said first and second radiation detectors for measuring
said radiation and background radiation, said first
and second detectors being positioned substantially
parallel with their respective active surfaces facing
each other in an aligned position, at a distance
allowing for temporary insertion of a sample device
of planar configuration in a measurement cavity
between the detectors,
external shielding means enclosing the radiation
detectors, said shielding means reducing background
radiation present in the measurement cavity, said
shielding means being provided with an opening for
receiving said sample device,
electronic processing means for handling decay pulses
received from the radiation detectors, calculating
from said pulses the radiation originating from the
sample and evaluating the result of said calculation,
and
means for recording and/or displaying the results of
said evaluation.

8. A method for measuring low energy sample radiation emanating from a sample containing a radiant matter, comprising the steps of:
inserting a sample into a measurement cavity between two aligned radiation detectors facing each other such that said sample radiation reaches only a first detector of said radiation detectors,
measuring for a predetermined time period the respective number of output pulses originating from ionising events occurring in the respective radiation detectors,
providing a first radiation value (D1) obtained from the number of pulses from said first detector and a second radiation value (D2) obtained from the number of pulses from the second detector,
providing a sample radiation value (D) by subtracting a background radiation value from said first value wherein said background radiation value is based upon a historical background radiation value (BGR) obtained prior to insertion of the sample by means of said second detector as well as said second radiation value (D2),
evaluating said sample radiation value (D) thereby determining the amount of radiant matter in the sample.

9. A method as claimed in claim 8, wherein said sample radiation value (D) is calculated from $$D = D1 - \frac{D2 + BGR}{2}$$

where
D1=the value of the number of pulses from said first radiation detector,
D2=the value of the number of pulses from said second radiation detector, and
BGR=the historical background radiation value, with all values being referred to a given time period.

10. A method as claimed in claim 8, wherein the sample device itself is used for shielding said second radiation detector from sample radiation.

11. A method as claimed in any one of claims 8, 9, and 10, wherein said first and second radiation values (D1, D2) as well as said historical background radiation value (BGR) are provided by taking the difference between the respective measured pulses and the number of coincidental pulses of the measured pulses.

12. A method as claimed in claim 11, wherein the number of coincidental pulses are pulses simultaneously measured by both radiation detectors.

13. A method as claimed in claim 8, wherein said historical background radiation value is measured and updated prior to insertion of a sample.

14. A method as claimed in claim 13, wherein
said historical background radiation measurement is performed during successive predetermined time periods,
after each time period a valve corresponding to the number of ionising events measured during that time period is stored in a memory, said memory containing a predetermined number of successive such values, while replacing the oldest value on a first in first out basis, and
a mean value is calculated based upon such stored values, said mean value being used as said historical background radiation value.

15. A method as claimed in claim 8, wherein said radiation to be measured is β-radiation.

16. A method for measuring low energy sample radiation emanating from a sample containing a radiant matter, comprising the steps:
inserting a sample into a measurement cavity between two aligned radiation detectors facing each other,
measuring for a predetermined time period the respective number of output pulses originating from ionising events occurring in the respective radiation detectors,
providing a first radiation value (D1) obtained from the measured number of pulses from said first detector and a second radiation value (D2) obtained from the measured number of pulses from the second detector,
providing a sample radiation value (D) by subtracting a background radiation value from the sum of said first and second radiation values (D1, D2), wherein said background radiation value is based upon a historical background radiation value (BGR) obtained prior to insertion of the sample, and
evaluating said sample radiation value (D) thereby determining the amount of radiant matter in the sample.

17. A method as claimed in claim 16, wherein said historical background radiation value is obtained using both said first and second radiation detectors.

18. A method as claimed in claim 16, further comprising the steps of
measuring when the sample is inserted in the measurement cavity for a predetermined time period the number of output pulses originating from ionising events occurring in a third radiation detector, said third detector being arranged in the measurement cavity such that radiation originating from the sample does not reach said third detector,
providing a third radiation value (D3) obtained from the measured number of pulses from said third detector, and
providing the background radiation value based upon said historical background radiation valve (BGR) as well as said third radiation value (D3).

19. A method as claimed in any one of claims 16, 17, and 18, wherein said first and second radiation values (D1, D2)

as well as said historical background radiation value (BGR) are provided by taking the difference between the respective measured pulses and the number of coincidental pulses of the measured pulses.

20. A method as claimed in claim 19, wherein the number of coincidental pulses are pulses simultaneously measured by both radiation detectors.

21. A method as claimed in claim 16, wherein said historical background radiation value is measured and updated prior to insertion of a sample.

22. A method as claimed in claim 21, wherein
said historical background radiation measurement is performed during successive predetermined time periods,
after each time period a value corresponding to the number of ionising events measured during that time period is stored in a memory, said memory containing a predetermined number of successive such values while replacing the oldest value on a first in first out basis, and
a mean value is calculated based upon such stored values, said mean value being used as said historical background radiation value.

23. A method as claimed in claim 16, wherein said radiation to be measured is $\beta$-radiation.

24. A method for measuring low energy sample radiation emanating from a sample containing a radiant matter, the method comprising:
providing a first radiation detector and a second radiation detector such that the two radiation detectors both measure substantially the same background radiation,
using said second radiation detector for measuring a historical background radiation mean value,
thereafter positioning the sample relative to said radiation detectors such that sample radiation reaches said first radiation detector only,
measuring both output pulses from said first radiation detector and output pulses from said second radiation detector, and
calculating a sample radiation value by subtracting from a measured number of output pulses from said first radiation detector a corresponding background radiation value based upon said historical background radiation mean value (BGR) and the measured number of output pulses from said second radiation detector.

25. A method as claimed in claim 24, wherein the sample is positioned between opposite, mutually facing detector windows of said first and second radiation detectors, such that sample radiation only strikes the detector window of said first radiation detector.

26. A method as claimed in claim 25, wherein coincidental pulses are disregarded when measuring.

27. A method as claimed in claim 24, wherein coincidental pulses are disregarded when measuring.

28. A method for measuring low energy sample radiation emanating from a sample containing a radiant matter comprising:
providing a first radiation detector and a second radiation detector such that the two radiation detectors both measure substantially the same background radiation,
using said radiation detectors for measuring a historical background radiation mean value,
thereafter positioning the sample relative to said radiation detectors such that sample radiation reaches both radiation detectors,
measuring both output pulses from said first radiation detector and output pulses from said second radiation detector, and
calculating a sample radiation value by subtracting from a measured number of output pulses from said detectors a corresponding background radiation value based upon said historical background radiation mean value.

29. A method as claimed in claim 28, further comprising:
providing a third radiation detector such that sample radiation does not reach the third radiation detector,
using said third radiation detector for measuring background radiation,
measuring output pulses from said third radiation detector, and
providing said background radiation value based upon said historical background radiation mean value and the measured number of output pulses from said third radiation detector.

30. A method as claimed in claim 29, wherein coincidental pulses are disregarded when measuring.

31. A method as claimed in claim 28, wherein the sample is positioned between opposite mutually facing detector windows of said first and second radiation detectors such that sample radiation strikes the detector windows of both said first and second radiation detectors.

32. A method as claimed in claim 31, wherein coincidental pulses are disregarded when measuring.

33. A method as claimed in claim 28, wherein coincidental pulses are disregarded when measuring.

* * * * *